March 15, 1938. G. W. WALTON 2,110,945
TELEVISION AND THE LIKE APPARATUS
Filed Aug. 30, 1933 3 Sheets-Sheet 1
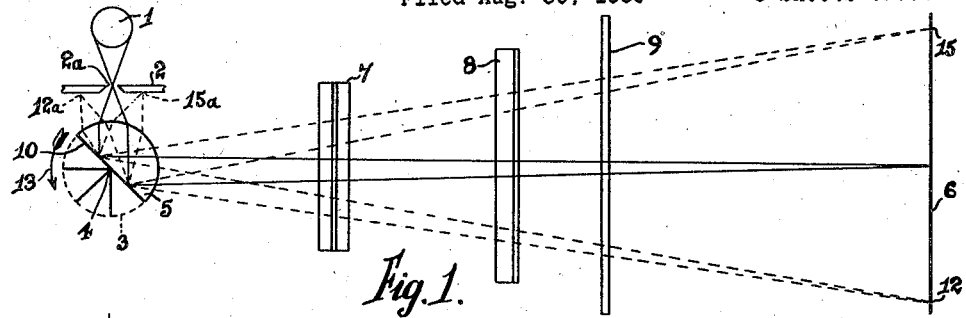
Fig. 1.
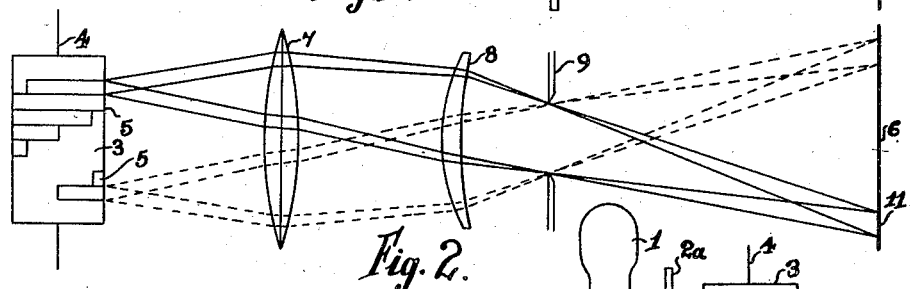
Fig. 2.
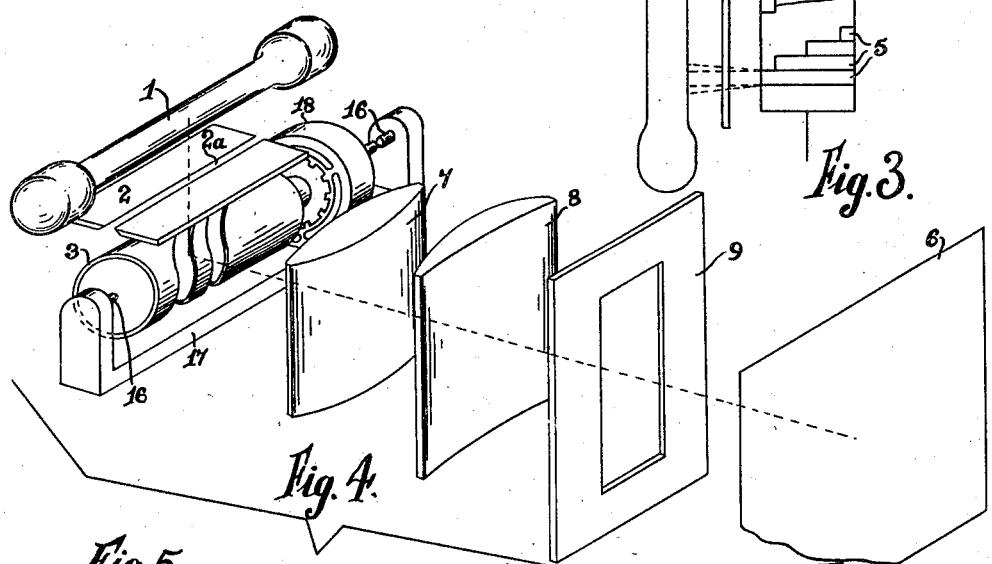
Fig. 3.
Fig. 4.
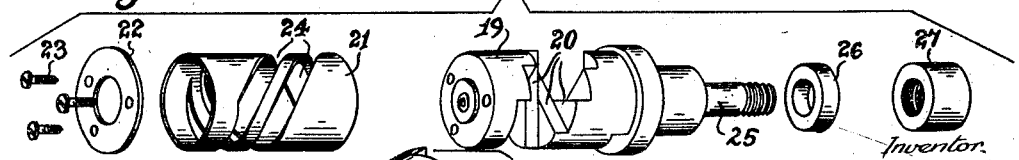
Fig. 5.
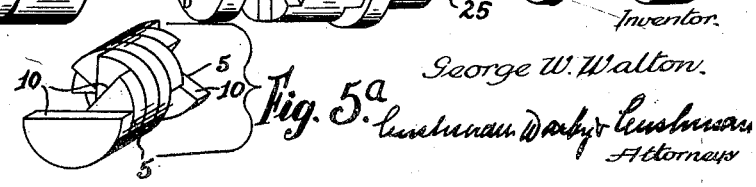
Fig. 5ª.
Inventor
George W. Walton
Cushman Darby Cushman
Attorneys

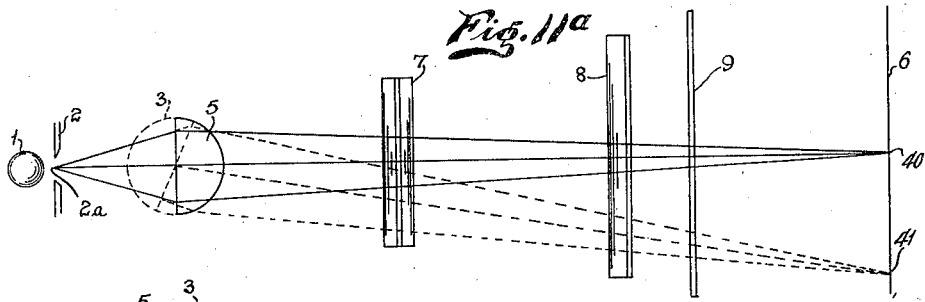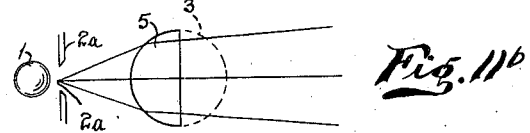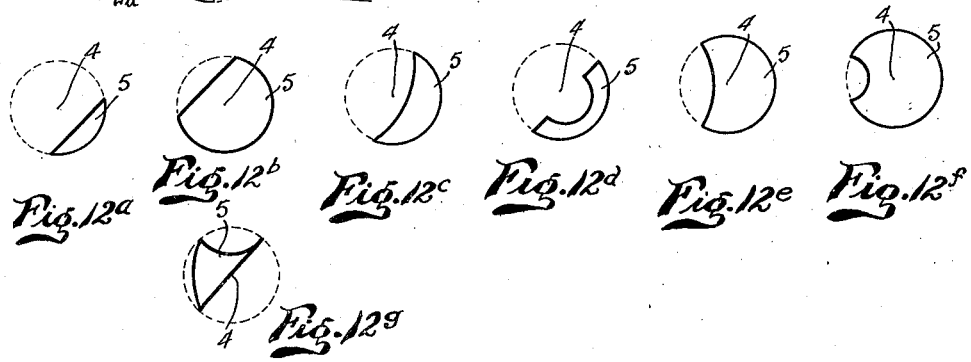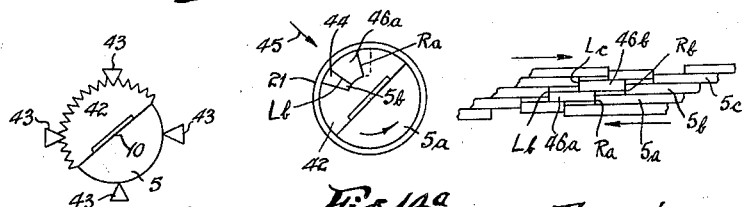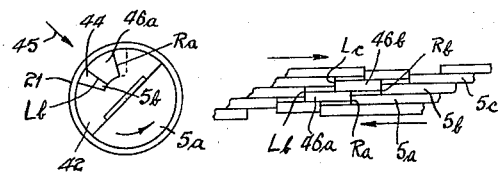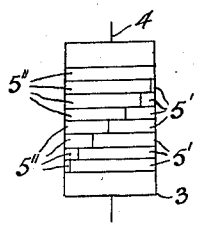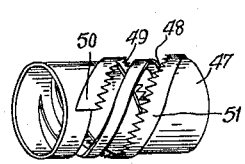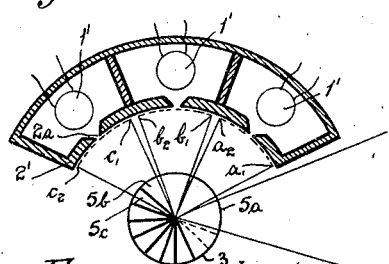

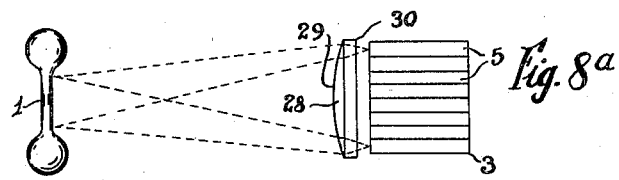
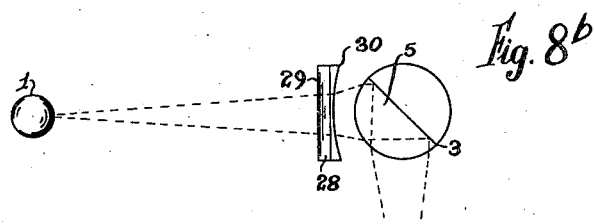
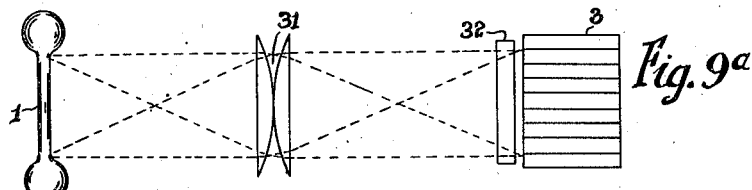
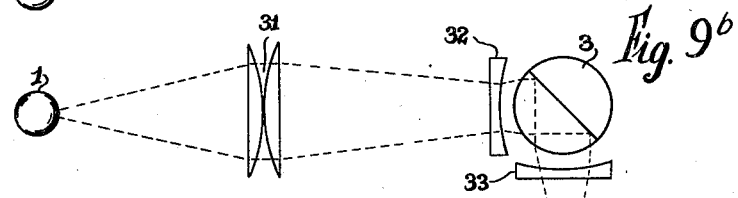
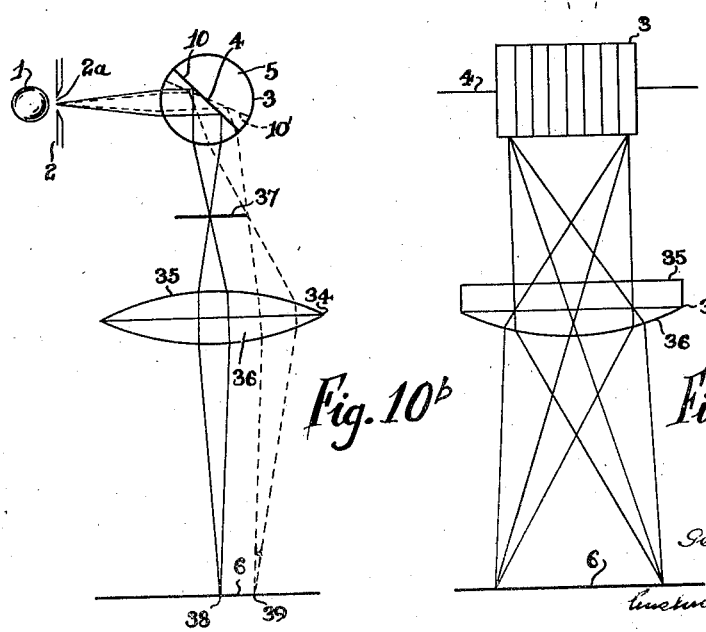
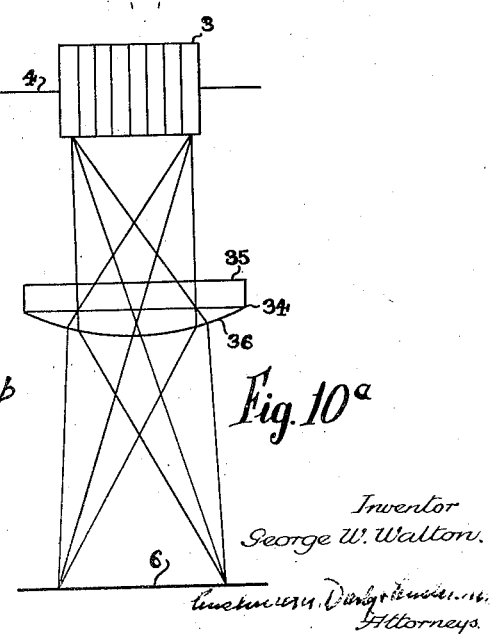

Patented Mar. 15, 1938

2,110,945

UNITED STATES PATENT OFFICE 2,110,945

TELEVISION AND THE LIKE APPARATUS

George William Walton, London, England

Application August 30, 1933, Serial No. 687,521
In Great Britain June 26, 1933

2 Claims. (Cl. 178—7.1)

The present invention relates to television, picture transmitting and receiving and the like apparatus.

In the specification of my patent application Serial No. 400,883 there is described apparatus for television and like purposes in which there is formed, as an intermediate step, a stixograph, that is to say an image of the kind in which the elemental areas into which a picture can be regarded as divided, are deployed in such a way that they do not overlap one another. Usually the picture is divided into strips and in the stixograph these strips are deployed so that they do not overlap when viewed in a direction perpendicular to that of the deployment. The stixograph image differs from an ordinary two dimensional image, amongst other things, in that it requires definition only in one direction, usually the direction of deployment.

Stixograph images have the obvious advantage over ordinary two dimensional images that the whole picture can be completely scanned by displacing it once, in the direction of deployment, over a scanning aperture. Part of the breaking up of the picture, which is necessary for television, is in fact accomplished optically.

The optical apparatus for producing deployed images comprises essentially some form of device, hereinafter referred to as an echelon device, having a number of optical elements (equal to the number of strips into which the picture is to be divided) arranged in echelon.

The methods described in my above mentioned patent specification for transmitting a stixograph consist generally in producing relative motion between the stixograph and one or more scanning apertures in a direction having a component in the direction of definition of the stixograph. As described in that specification, the relative motion can in one case be obtained by setting in motion a part of the optical system forming the stixograph and the present invention is more particularly concerned with providing a new or improved type of echelon device and mounting which can be set in motion conveniently. The invention is also concerned with the provision of the optical and other means required to make the echelon device operative as a stixograph optical system for television and the like.

According to the present invention there is provided, in or for stixograph apparatus for television and the like, an echelon device comprising a plurality of refractively acting laminae mounted for motion about an axis substantially perpendicular to their planes, each of said laminae being angularly displaced around said axis relatively to the other laminae.

According to a further feature of the present invention an echelon device for television and like purposes comprises a plurality of refractively acting laminae of like shape mounted for motion about an axis substantially perpendicular to their planes, the laminae each having one or more surfaces which, during operation of the device, are transparent to the entrant and emergent light so that this light penetrates within the laminae, and the laminae being fixed relatively to one another in such positions that each lamina is angularly displaced around said axis relatively to the other laminae.

This echelon device is preferably the sole moving means provided to enable scanning to be performed and may operate either by continuous rotary motion or by vibratory motion about the axis.

By arranging that the laminae have transparent entrant and emergent surfaces, the light passing through the laminae, either to be reflected back through the entrant surface acting also as the emergent surface or to pass out through a different surface, experiences repeated reflections in planes parallel to the axis of the device and is thus averaged in these planes as described in my earlier specification above referred to.

The scanning device of the present invention is clearly distinguished from a known form of rotating echelon scanning device which could be used in a stixograph optical system in which the surfaces on which the light is incident are themselves reflecting and no internal reflections take place within laminae and in which the laminae act reflectively but not refractively.

The invention will be described with reference to the accompanying drawings, in which Figs. 1, 2, and 3 are diagrammatic views in side elevation, part-plan and front elevation of one form of apparatus according to the invention, Fig. 4 is a diagrammatic perspective view of the apparatus of Figs. 1–3, Fig. 5 illustrates one form of construction of an echelon device according to this invention, the parts of the device being shown disassembled, Fig. 5a is a perspective view of the laminae of the echelon device of Figs. 1 to 4.

Figs. 6 to 11 illustrate modified forms of apparatus according to this invention, Figs. 12a to 12g show various forms which the optical laminae of the echelon device may take according to the invention, and Figs. 13 to 15 show alternative ways of locating the laminae relatively to one another according to the invention.

In the echelon devices illustrated, only a few laminae are shown, it will be understood that in practice the number employed will be much greater, for example from 30 to 100 or more.

Referring to Figs. 1 to 4, and assuming that the apparatus is a television transmitter, 1 is a photo-electric cell in front of which is arranged a diaphragm 2 having an optical slit 2a therein. An echelon device 3 mounted for rotation about an axis 4 comprises a number of glass laminae 5 each of semi-cylindrical shape. Each lamina is angularly displaced around axis 4 relatively to the neighbouring laminae. Between the echelon device and an object 6 are arranged two cylindrical lenses 7 and 8 having power only in a horizontal direction and an apertured diaphragm or stop 9.

Light from a vertical strip of the object 6 passes through the stop 9 and object lens system 7 and 8, falls upon one lamina of the echelon 3 and is reflected from the back surface 10 thereof through the aperture 2a on to the photo-cell 1. The lenses 7 and 8 form an image of the object 6 in the entrant surface of the echelon device 3 and thus ensure that any one lamina thereof views only one vertical strip of the object, for example as seen from Fig. 2, one lamina receives light only from the strip 11 of the object. This image formed by lenses 7 and 8 is of course focussed only in a horizontal direction. Lenses 7 and 8 do not affect the focussing in the vertical direction and the laminae which are the only lenses having power in a vertical direction form images of their corresponding vertical strips of the object upon the diaphragm 2. Thus an image of point 12 in strip 11 is formed at point 12a and an image of point 15 is formed at 15a. The next lamina will view the next strip of the object and will form on diaphragm 2 an image of this strip, the angular displacement between the laminae being such that all points in this second image are to the left of point 12a in Fig. 1. Thus all the laminae which are viewing the object at any time form around the echelon device, a stixograph of the parts of the object viewed.

Although a stixograph of a number of strips of the object is formed on the diaphragm 2, only one small part of the stixograph is operative at any time on the photo-cell 1 through aperture 2a. As the echelon is rotated in the direction of arrow 13, the stixograph will be swept over the aperture 2a and scanned. When the echelon device has made one complete revolution, the whole of the stixograph of the object will have been swept over the aperture 2a and scanned. Currents corresponding to the light and shade values of the stixograph, and therefore of the object, are generated in the cell 1 and may be transmitted in any known or suitable manner to a receiving station.

When the echelon device has performed one complete revolution it may continue to rotate in the same direction or may reverse its direction, the scanning motion thus being either a continuous rotation or an oscillation. If desired the echelon device can be so constructed that the whole object is scanned a plurality of times in each revolution of the echelon device. For example if the object is to be divided into 30 strips, the echelon device may comprise 90 laminae each angularly displaced by 4° relatively to the adjacent lamina. Each group of 30 laminae then serves to produce a stixograph of the whole object. The laminae would in this case not be semi-circular but could be of the shape shown in Fig. 10a for example. Where the device comprises only two sets of laminae, each set being adapted to produce a stixograph of the whole object, the laminae may be semi-circular if desired. A device of this kind is shown in Fig. 6 and can be used in place of the echelon device 3 of Figs. 1 and 2. The laminae 5' form one set and the laminae 5" the other set. The angular spacing between the sixty laminae required for a 30 strip picture may in this case be 6°. Many fewer laminae are shown in the figure for clearness.

In any case the arrangement is made such that, with the particular angular spacing provided between laminae of each set, the strip image produced by one lamina is displaced clear of the strip image formed by the adjacent laminae.

The apparatus above described may be adapted for use as a receiver by substituting for the cell 1 a light source and for the object 6 a reproducing screen. The intensity of the light passing from the source to the screen is controlled in accordance with received picture signals either by applying these signals to the source itself to vary the intensity of the light emitted, or by causing the signals to actuate a light valve.

It will be noticed that the optical power necessary in the vertical plane is provided solely by the lenses 5 of the echelon device 3 and this feature is of assistance in producing simple apparatus. Further, owing to the fact that the light passing through each lamina to the back surface 10 thereof and from thence out through the curved surface experiences repeated reflections in planes parallel to the axis 4, the light is averaged and in the case of the receiver the image of the emergent surface of the lamina formed by lenses 7 and 8 on the screen 6 (such as image 11, Fig. 2) is of uniform brightness in a horizontal direction. In the case of the transmitter any variations in light and shade in a horizontal direction across a vertical strip of the object are in the stixograph represented by the average brightness or density of this transverse band.

In the perspective view of Fig. 4, the echelon device 3 is shown mounted for rotation between centres 16 carried on a base 17, means 18 such as an electric motor of the synchronous type, for example a phonic wheel, being provided for rotating the echelon device 3.

Alternatively the echelon device may be driven by a belt or other suitable coupling from a separate motor. In this case if desired the synchronous motor upon the shaft of the echelon device may be retained and used for synchronizing purposes, the greater part of the driving energy being derived from the separate motor.

Fig. 5a is an exploded view illustrating one method of constructing an echelon device, such as 3 of Figs. 1 to 4.

The echelon mount 19 which may be of aluminium alloy is provided with a series of steps 20. If, for example, the apparatus is to produce a stixograph by dividing the object into 30 lines, 30 such steps are provided and each is angularly displaced relatively to the adjacent steps by 12°. In order to form the laminae 5 to the correct shape, 30 glass laminae of approximately the correct shape are cemented together and the body so formed is ground to half cylindrical shape. The cement is then dissolved out and the individual laminae, which will be of like shape, separated from one another. The laminae are then arranged with their flat surfaces 10 which are parallel to the axis 4 upon the steps of the mount 19, after which a retaining sleeve 21 is passed over the mount 19 and is secured thereto by an end plate 22 and screws 23. The sleeve 21 is provided with two helical slots 24 one for the incident and the other for the emergent rays. The mount 19 has a cylindrical portion 25 which accommodates the rotor of the driving or synchronizing electric motor, this rotor being held in position by a washer 26 and nut 27.

The laminae may be mounted and positioned in any other convenient manner. For example they may be adjusted by hand and the correctness of their positions may be judged by suitable optical indicating means. Other methods of constructing the echelon device will be described later.

If it is desired to stick the laminae together, then their adjacent surfaces should be silvered so that efficient internal reflection of light passing through them takes place as already described. If they are placed in a pile with no cement between them, silvering will usually be found unnecessary. The surfaces 10 of the laminae may also be silvered if desired but this is usually unnecessary when the laminae are of semi-cylindrical shape.

In Fig. 7 is shown an arrangement employing a plurality of scanning apertures. This arrangement may be substituted for the parts 1, 2, and 3 of Figs. 1 and 2. As shown in Fig. 7, the stixograph is formed upon the curved surface of a diaphragm 2' having three apertures 2'a. Behind each aperture is a photo cell 1'. The three cells may be associated with separate transmission channels. The formation of the stixograph is indicated diagrammatically in this figure. Three laminae 5a, 5b, and 5c are shown active, the lamina 5a being the uppermost in the figure. Lamina 5a produces an image of the strip of the object dealt with by it between points $a_1$ and $a_2$, lamina 5b produces an image of its strip between $b_1$ and $b_2$ and lamina 5c produces its image between points $c_1$ and $c_2$. These three images are of course in different planes parallel to the surface of the paper.

This arrangement can be used for reproducing by substituting light sources for the cells 1'.

A modification of part of the apparatus of Figs. 1 to 4 whereby fuller use may be made of the light from the light source, or, in the case of a transmitter, whereby a smaller photo-electric cell can be used, is shown in Fig. 8. Between the echelon device 3 and the photo-cell 1 is arranged a lens 28 whereby all parts of the cell receive light from each lamina of the echelon 3. Fig. 8a is in plan and view Fig. 8b is in elevation. It will be seen that lens 28 is a compound cylindrical lens having a part 29 with power only in a horizontal direction and a part 30 with power only in a vertical direction. The part 29 acts as a condenser, for the purpose already described, whilst the part 30 serves to lengthen the effective focus of the echelon lenses 5. The effective aperture can thus be increased and moreover the lens 30 can be used in known manner to correct aberrations of the lenses 5.

Figs. 9a and 9b show arrangements which are modifications of those of Figs. 8a and 8b, Fig. 9a being in plan and Fig. 9b being in elevation. These figures show a separate condenser system 31 is provided to enable the whole photo-cell 1 to obtain light from all laminae of the echelon device 3 and two cylindrical lenses 32 and 33 of negative curvature are provided. The two lenses 32 and 33 act in a similar way to lens 30 of Figs. 8a and 8b and may be made to annul the power of the echelon lenses completely if desired. An effective aperture of F1.5 or even up to F1 can be obtained in this way and an aperture of say F3 or even greater can be obtained for the system as a whole.

Figs. 10a and 10b are diagrammatic illustrations of a further modified system, the two views being taken in planes at right angles to each other. The object 6 is viewed by a lens system 34 which in the plane of Fig. 10b forms a real image of the object at 37. Lens system 34 comprises a cylindrical surface 35 and a spherical surface 36. In the vertical plane of Fig. 10b both lenses 35 and 36 have power and together focus the image of the object at 37. In the horizontal plane of Fig. 10a however, only lens 36 has power and this is arranged to focus an image of the object 6 on the front face of the echelon device 3. A stixograph is, as before, formed around the echelon device 3 and in the position indicated by full lines in Fig. 10b the image of point 38 of the object is active on the cell 1 through aperture 2a. As the echelon device 3 is rotated, the active lamina 5 moves from the full line to the dotted line position and the point of the object active on the photo-cell changes from point 38 to point 39.

Fig. 11a illustrates the use of the laminae of an echelon device purely as lenses. The optical system closely resembles that of Figs. 1 to 4 and like parts are in Figs. 11a and 11b given the same references as in Figs. 1 to 4.

The echelon lenses are given such focal length and are so disposed that they focus an image of the object 6 on the aperture 2a. When the active lens 5 is in its mid position, the image of point 40 is active on the aperture 2a and when it has moved through a small angle (indicated by the dotted diameter) the image of point 41 is active on the aperture. As will be seen from Fig. 11b when any lens 5 reaches a position 180° displaced from that in Fig. 11a, no image of the object 6 is focussed on the diaphragm 2 and any tendency for the lenses to function twice is obviated.

In one echelon device according to this invention the diameter of the pile of laminae (of which there are 100) is 6 cm. and the thickness of each lamina is about 1 mm. In another example with 30 laminae the diameter is 2 cm. and the thickness of each lamina is about 0.7 mm. Thus the length of the light path within the laminae is great compared with the thickness of the laminae and provides good opportunity for internal reflections of the light within the laminae. The ratio of the radius of the laminae (in the case of semi-circular laminae) to the thickness thereof should preferably be 10 or more, dependent upon the aperture.

Lenses of a great variety of shapes may be used in the echelon device according to this invention. Some of these are shown by way of example in Figs. 12a to 12g. In each of the examples, the axis of rotation is indicated by 4. The lenses of Figs. 12a and 12b are plano-convex and of positive power, the former being less than a semi-circle and the latter greater than a semi-circle. The lenses of Figs. 12c to 12d are concavo-convex lenses the former of positive and the latter of negative power. The same applies to the lenses of Figs. 12e and 12f. In the case of the lens of Fig. 12g the entrant and emergent surfaces have curvatures of different magnitude and one is positive and the other negative in power.

Although all the lenses shown have circular or part circular contours this is not a necessity although it is usually the most convenient shape. Other contours can also be used. Further the various shapes of lenses shown in Figs. 12a to 12g may be used as pure lenses, as in Figs. 11a and 11b, or as combinations of lenses and mirrors, as in Figs. 1 to 10b, the reflecting surfaces being silvered or not according to circumstances.

Certain alternative methods of assembling the laminae of the echelon device are illustrated in Figs. 13 to 15. In Fig. 13 there is shown a lenticular lamina 5 having a semi-circular plate 42 located against its diametrical surface 10. In order that the reflecting properties of this surface may not be interfered with, the diametrical surface of the plate 42 is preferably arranged to bear only at its ends upon the surface 10. The plate 42 has a number of teeth cut around its periphery and a number of rods 43 arranged around the plate 42 have a V shaped section adapted to fit into the spaces between the teeth. The rods 43 may be fixed at one end to an end plate and may slide at their opposite ends through a second end plate, suitable means being provided for clamping the end plates together with the stack of laminae 5 between them. This construction is however not illustrated.

Assuming that the echelon device is to comprise 36 laminae, the angular spacing between laminae will be 10°. The number of teeth in the plate 42 may therefore be any integral multiple (including unity) of 18. This number is suitable for example where the number of rods 43 is 4 or 6 provided that these are uniformly or otherwise suitably spaced. Because teeth can be cut with considerable accuracy this method of assembly is a useful one.

Fig. 14a is a view similar to that of Fig. 13 of another assembly arrangement and Fig. 14b is a fragmentary side view of the structure of Fig. 14a taken in the direction of arrow 45. In this case, instead of the plates 42 having teeth, they are each provided with a single V shaped notch 44. Wedge-shaped distance pieces 46a, 46b etc. are also provided in the notches 44, these distance pieces being rather narrower than the notches 44. Outward movement of the distance pieces is prevented by a sleeve 21 such as that shown in Fig. 5. The laminae are arranged in a pile with the distance pieces located as shown in Fig. 14b and the pile is then twisted as indicated by the arrows. The effect of this is for distance piece 46a to bear between face Ra of the notch 44 in lamina 5a and face Lb of the notch in lamina 5b, distance piece 46b to bear between face Rb of 5b and face Lc of 5c and so on. If the distance pieces and notches are accurately made the desired angular spacing can be rapidly obtained in this way and the pile of laminae can then be clamped together.

In Fig. 15 there is shown a mounting 47 having two helical grooves 48 and 49 formed therein as in the case of the sleeve 21 of Fig. 5. Two strips 50 and 51 each having teeth cut along one edge are wrapped around the cylindrical surface with their teeth projecting over the helical grooves as shown. The strips are secured in this position and the teeth serve to locate the diametrical surfaces of the laminae. This will be understood from an inspection of Fig. 5, where the steps 20 cut in the mount 19 are seen to have a sawtooth form around the surface of the mount. The laminae may be retained in position by sliding a second sleeve, having a shape similar to sleeve 21 in Fig. 5, over the mounting 47.

The assembly methods described with reference to Figs. 13 to 15 have assumed the use of semi-cylindrical laminae. Clearly, however, the methods can be adapted to laminae of other shape.

I claim:

1. Apparatus for television and the like purposes comprising a light source, a screen for receiving an image of said light source and on the optical axis between said light source and said screen an echelon device having a plurality of laminae each in the form of a cylindrical lens, each having parallel major surfaces of relatively large area and edge surfaces of relatively small area, said laminae being arranged with major surfaces of adjacent laminae contiguous, means for supporting said device for rotation about an axis substantially perpendicular to the planes of said laminae and substantially coincident with the axes of curvature of said cylindrical lenses and between said echelon device and said screen, a lens system having optical power in planes parallel to said axes, each of said laminae being angularly displaced around said axis relatively to the other said laminae, light from said source being transmitted through the bodies of said laminae.

2. Apparatus for television and like purposes comprising a photo-sensitive device, an object and on the optic axis between said object and said photo-sensitive device an optical system comprising a plurality of laminae each in the form of a cylindrical lens, each having parallel major surfaces of relatively large area and edge surfaces of relatively small area, said laminae being arranged with major surfaces of adjacent laminae contiguous, means for supporting said device for rotation about an axis substantially perpendicular to the planes of said laminae, each of said laminae and substantially coincident with the axes of curvature of said cylindrical lenses and between said echelon device and said object, a lens system having optical power in planes parallel to said axes being angularly displaced around said axis relatively to the other said laminae, light from said object passing through the bodies of said laminae.

GEORGE WILLIAM WALTON.